US010637329B2

(12) United States Patent
Heeke (10) Patent No.: US 10,637,329 B2
(45) Date of Patent: Apr. 28, 2020

(54) HYBRID MOTOR ASSEMBLY WITH ROTOR COOLING AND METHOD THEREOF

(71) Applicant: Schaeffler Technologies AG & Co. KG, Herzogenaurach (DE)

(72) Inventor: Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 279 days.

(21) Appl. No.: 15/800,149

(22) Filed: Nov. 1, 2017

(65) Prior Publication Data
US 2019/0131850 A1 May 2, 2019

(51) Int. Cl.
*H02K 1/28* (2006.01)
*H02K 9/19* (2006.01)
*H02K 1/32* (2006.01)
*H02K 5/20* (2006.01)
*B60K 1/00* (2006.01)

(52) U.S. Cl.
CPC .............. *H02K 9/19* (2013.01); *H02K 1/32* (2013.01); *H02K 5/20* (2013.01); *B60K 1/00* (2013.01); *B60K 2001/006* (2013.01)

(58) Field of Classification Search
CPC ........... H02K 1/28; H02K 1/32; H02K 7/006; H02K 9/19
See application file for complete search history.

(56) References Cited

U.S. PATENT DOCUMENTS

| 3,800,174 A * | 3/1974 | Butterfield .............. H02K 9/19 310/61 |
| 4,311,932 A | 1/1982 | Olson |
| 6,935,450 B1 * | 8/2005 | Tsuzuki .................. B60K 6/26 180/65.26 |
| 7,173,358 B2 | 2/2007 | Drubel |
| 2009/0157272 A1 | 6/2009 | Uhler et al. |
| 2016/0084363 A1 | 3/2016 | Steinberger et al. |
| 2017/0054344 A1 | 2/2017 | Larjola et al. |

FOREIGN PATENT DOCUMENTS

| JP | 2012-165620 A | 8/2012 |
| JP | 2015-104214 A | 6/2015 |

* cited by examiner

*Primary Examiner* — Dang D Le (57) ABSTRACT

A hybrid motor assembly, including: an axis of rotation; a torque converter; an electric motor including a stator and a rotor; and a rotor carrier. The torque converter includes: a cover arranged to receive torque; an impeller non-rotatably connected to the cover; and a turbine in fluid communication with the impeller. The rotor carrier is connected to the rotor and includes a cooling chamber. The cooling chamber is bounded at least in part by the rotor, is sealed from the stator, and is arranged to receive cooling fluid.

18 Claims, 9 Drawing Sheets

HYBRID MOTOR ASSEMBLY WITH ROTOR COOLING AND METHOD THEREOF

TECHNICAL FIELD

The present disclosure relates to a hybrid motor assembly including a torque converter and an electric motor, in particular, a rotor carrier arrangement enabling use of charge oil for the torque converter to cool a rotor for the electric motor while maintaining a dry environment for a stator for the electric motor.

BACKGROUND

It is known to use automatic transmission fluid (ATF) to cool an electric motor in a hybrid assembly for a motor vehicle. U.S. Pat. Nos. 7,173,358 and 4,311,932 disclose rotor cooling. In particular, ATF is pumped through an input shaft for a transmission to flow out across a rotor in an electric motor and to spray stator end windings in the electric motor. The ATF then runs back to the transmission sump. The preceding arrangement results in a significant power loss due to drag from ATF in the motor gap between the rotor and the stator and drag on the torque converter, since the torque converter must rotate through the sprayed ATF. Further, a larger pump may be required to supply sufficient cooling oil to the rotor and transmission at low engine speeds. After cooling the rotor, the fluid is drained back to the transmission sump, by-passing the transmission oil cooler. However, the fluid has picked up significant heat, which increases the temperature in the sump and diminishes the cooling capacity of the fluid.

SUMMARY

According to aspects illustrated herein, there is provided a hybrid motor assembly, including: an axis of rotation; a torque converter; an electric motor including a stator and a rotor; and a rotor carrier. The torque converter includes: a cover arranged to receive torque; an impeller non-rotatably connected to the cover; and a turbine in fluid communication with the impeller. The rotor carrier is connected to the rotor and includes a cooling chamber. The cooling chamber is bounded at least in part by the rotor, is sealed from the stator, and is arranged to receive cooling fluid.

According to aspects illustrated herein, there is provided a hybrid motor assembly, including: an axis of rotation; a torque converter; an electric motor; a rotor carrier; and a flange. The torque converter includes: a cover arranged to receive torque; an impeller non-rotatably connected to the cover; and a turbine in fluid communication with the impeller. The electric motor includes a stator and a rotor. The rotor carrier is connected to the rotor and includes a cooling chamber bounded at least in part by the rotor. The flange is non-rotatably connected to the rotor and includes an input channel in fluid communication with the cooling chamber and arranged to receive a cooling fluid and an output channel in fluid communication with the cooling chamber and arranged to discharge the cooling fluid.

According to aspects illustrated herein, there is provided a method of operating a hybrid motor assembly, including: transmitting a cooling fluid from a first channel in a transmission input shaft to an input channel in a flange non-rotatably connected to the transmission input shaft; flowing the cooling fluid from the input channel through a cooling chamber bounded, at least in part, by a rotor for an electric motor and by a rotor carrier non-rotatably connected to the rotor and the flange; flowing the cooling fluid from the cooling chamber through an output channel in the flange to a second channel in the transmission input shaft; and flowing the cooling fluid from the second channel into a torque converter, the torque converter including a cover arranged to receive torque, an impeller non-rotatably connected to the cover, and a turbine in fluid communication with the impeller.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 9:
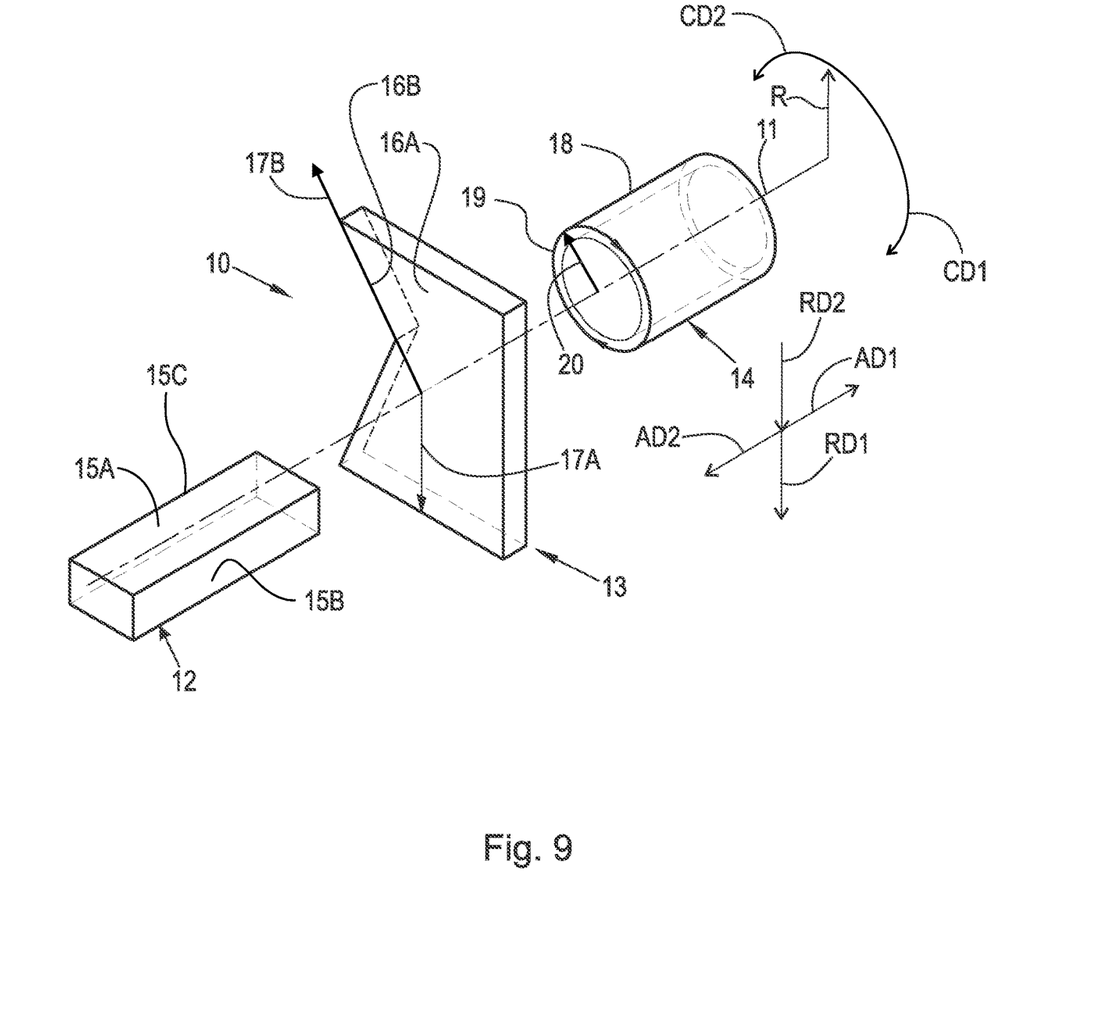
FIG. 9 is a perspective view of a cylindrical coordinate system demonstrating spatial terminology used in the present application.

FIG. 9 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
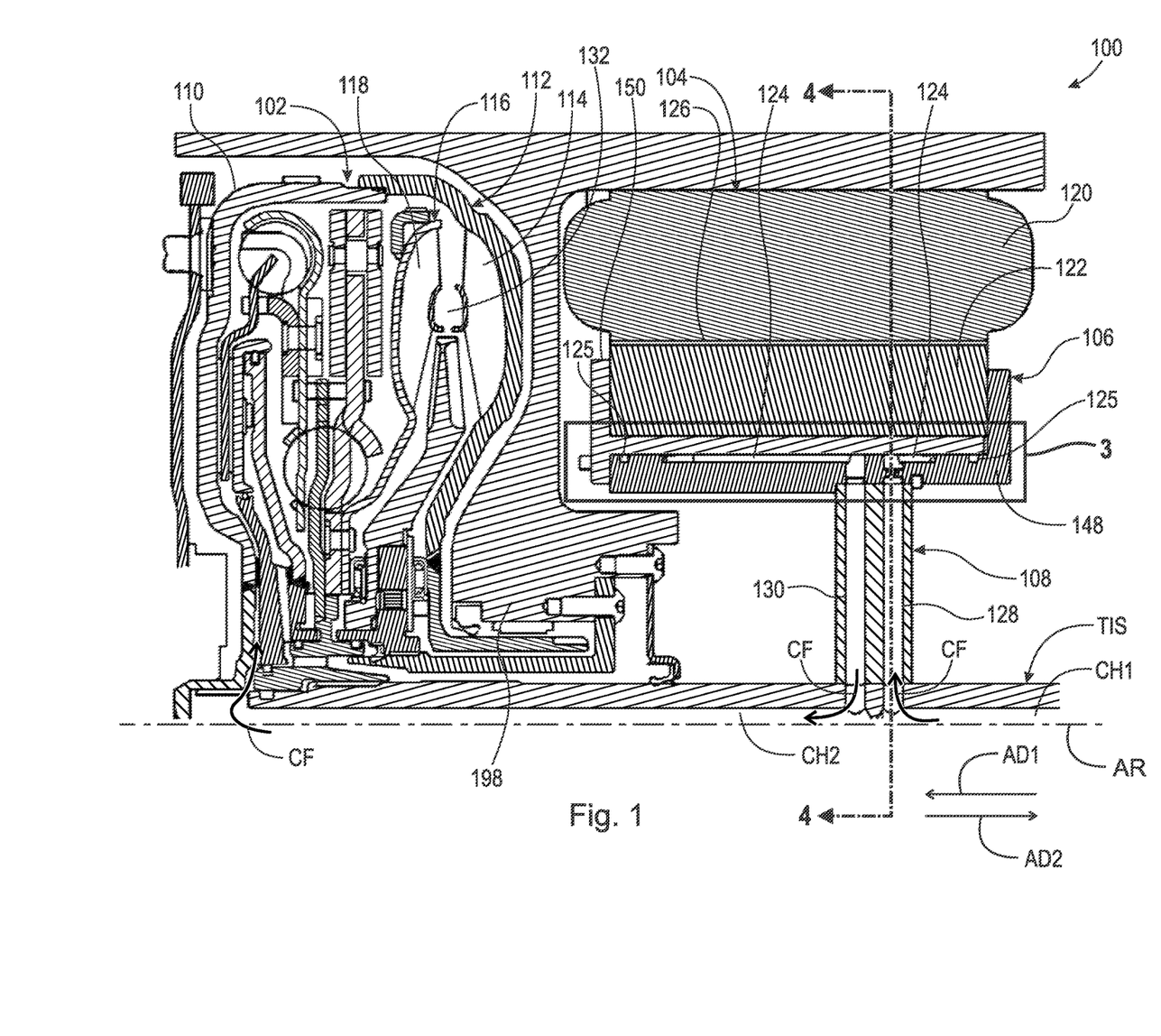
FIG. 1 is a partial cross-sectional view of a hybrid motor assembly.

FIG. 1 is a partial cross-sectional view of hybrid motor assembly 100.

Figure 2:
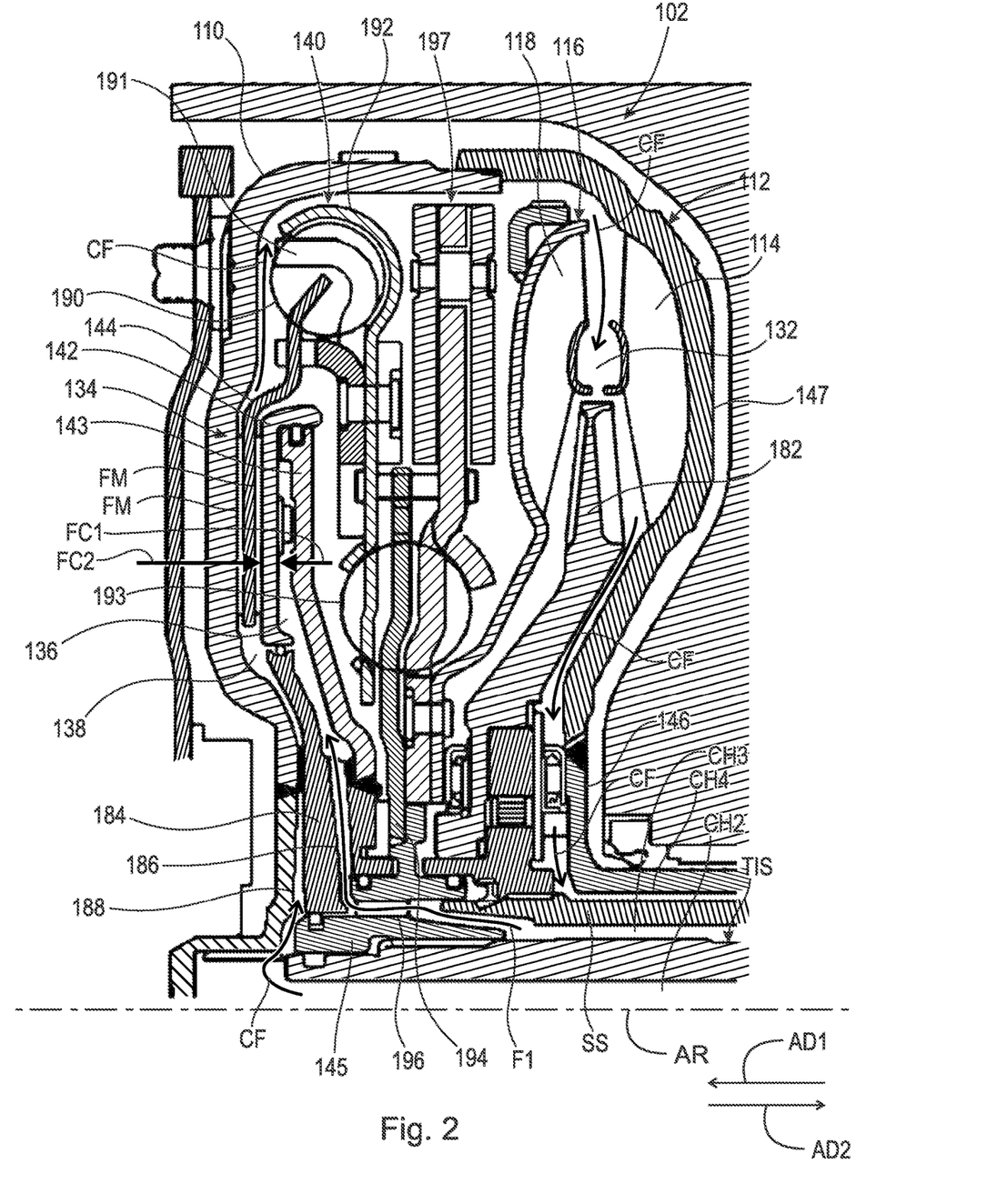
FIG. 2 is a detail of a torque converter shown in FIG. 1.

FIG. 2 is a detail of a torque converter shown in FIG. 1. The following should be viewed in light of FIGS. 1 and 2. Hybrid motor assembly 100 includes torque converter 102, electric motor 104, rotor carrier 106, and flange 108. In an example embodiment, flange 108 is separately formed from carrier 106 and non-rotatably connected to carrier 106. In an example embodiment (not shown), flange 108 is integral to (part of) carrier 106. Torque converter 102 includes: cover 110 arranged to receive torque; impeller 112 non-rotatably connected to cover 110 and including at least one impeller blade 114; and turbine 116 in fluid communication with impeller 112 and including at least one turbine blade 118. Electric motor 104 includes stator 120 and rotor 122. Rotor carrier 106 is non-rotatably connected to rotor 122 and includes at least one cooling chamber 124 arranged to receive cooling fluid CF. Cooling chamber 124 is bounded at least in part by rotor 122. In an example embodiment, cooling chamber 124 is: sealed from stator 120, for example by seals 125; and sealed from motor gap 126, for example by seals 125. Gap 126 is radially disposed between rotor 122 and stator 120 as is known in the art.

Cooling fluid CF can be any cooling fluid known in the art, for example, automatic transmission fluid. By "sealed from stator 120" we mean that cooling fluid CF does not flow out of chamber 124 into contact with stator 120. By "sealed from motor gap 126" we mean that fluid CF does not flow out of chamber 124 into gap 126. Thus, stator 120 operates in a dry environment and there is no viscous drag due to fluid in gap 126. Stated otherwise, stator 120 and motor gap 126 are isolated from chamber 124 and fluid CF. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

Flange 108 includes input channel 128 and output channel 130. Channels 128 and 130 are in fluid communication with chamber 124. That is, channels 128 and 130 are open to chamber 124. Channel 128 is arranged to receive cooling fluid CF from channel CH1 in transmission input shaft TIS and to transmit fluid CF to chamber 124 to cool rotor 122. Channel 130 drains fluid CF from chamber 124 and discharges fluid CF to channel CH2 in shaft TIS. Channel CH1 is sealed from channel CH2. In an example embodiment, channels 128 and 130 are axially aligned and axially off-set. In an example embodiment (not shown), channels 128 and 130 are both axially off-set and circumferentially off-set.

Rotor 122 is arranged to non-rotatably connect to transmission input shaft TIS. Torque converter 102 is arranged to receive fluid CF from channel CH2 as a charge fluid for torque converter 102. For example, fluid CF flows into torque converter 102 and through torus 132 formed by impeller 112 and turbine 116.

In an example embodiment, torque converter 102 is a three-pass torque converter and includes: lock-up clutch 134; apply chamber 136; release chamber 138; and torsional damper 140. Clutch 134 includes piston plate 142. Chamber 136 is formed, at least in part, by piston plate 142 and backing plate 143. Fluid CF flows into chamber 138 from channel CH2. For a lock-up mode for torque converter 102, in which cover 110 is engaged with plate 142, in particular, non-rotatably connected to piston plate 142, fluid F1 flows from channel CH3, formed in part by stator shaft SS and shaft TIS, to chamber 136. Force FC1, in direction AD1, from fluid F1 in chamber 136, is greater than force FC2, in direction AD2, from fluid CF in chamber 138, causing piston plate 142 to displace in axial direction AD1 to non-rotatably connect plate 142 and input plate 144 for damper 140 with cover 110.

Torque then flows from cover 110 to output hub 145, arranged to non-rotatably connect to shaft TIS, through damper 140 as is known in the art. Chamber 138 is in fluid communication with torus 132 in the lock-up mode, that is, fluid CF flows from chamber 138 into torus 132 during the lock-up mode. For example, fluid CF flows out of chamber 138 and to torus 132, through grooves (not shown) in friction material FM disposed between piston plate 142 and cover 110. Fluid CF exits torus 132 to channel CH4. Channel CH4 is formed, at least in part, by hub 146 and shaft SS. Hub 146 is non-rotatably connected to impeller shell 147. Shell 147 is non-rotatably connected to cover 110.

For a torque converter mode, force FC2 is greater than force FC1, for example, at least a portion of fluid F1 is drained from chamber 136, causing piston plate 142 to displace in axial direction AD2, opposite direction AD1, and to disconnect from cover 110. Torque then flows from cover 110 to impeller 112 as is known in the art.

Figure 3:
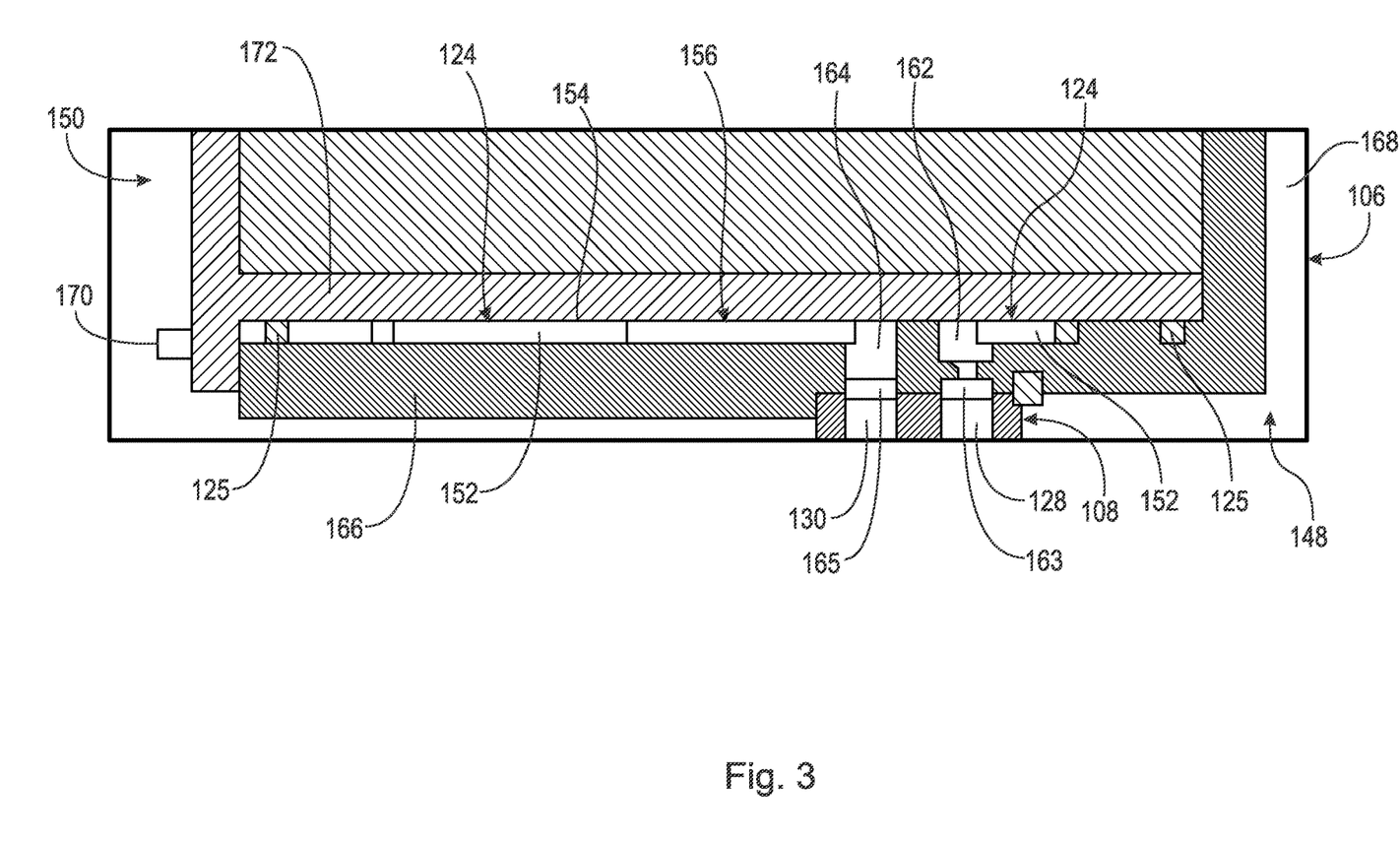
FIG. 3 is a detail of area 3 in FIG. 1.

FIG. 3 is a detail of area 3 in FIG. 1.

Figure 4:
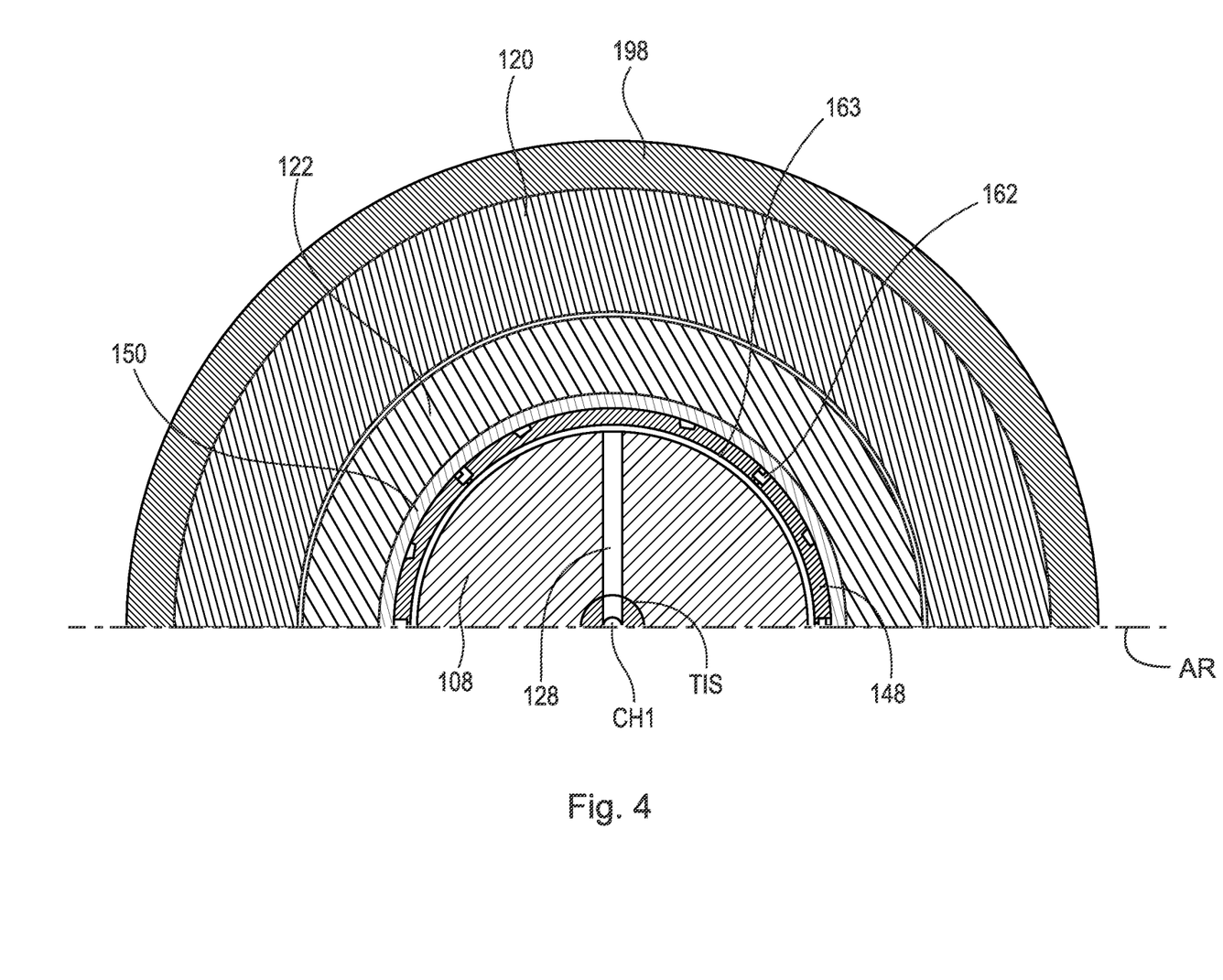
FIG. 4 is a cross-sectional view generally along line 4-4 in FIG. 1.

FIG. 4 is a cross-sectional view generally along line 4-4 in FIG. 1.

Figure 5:
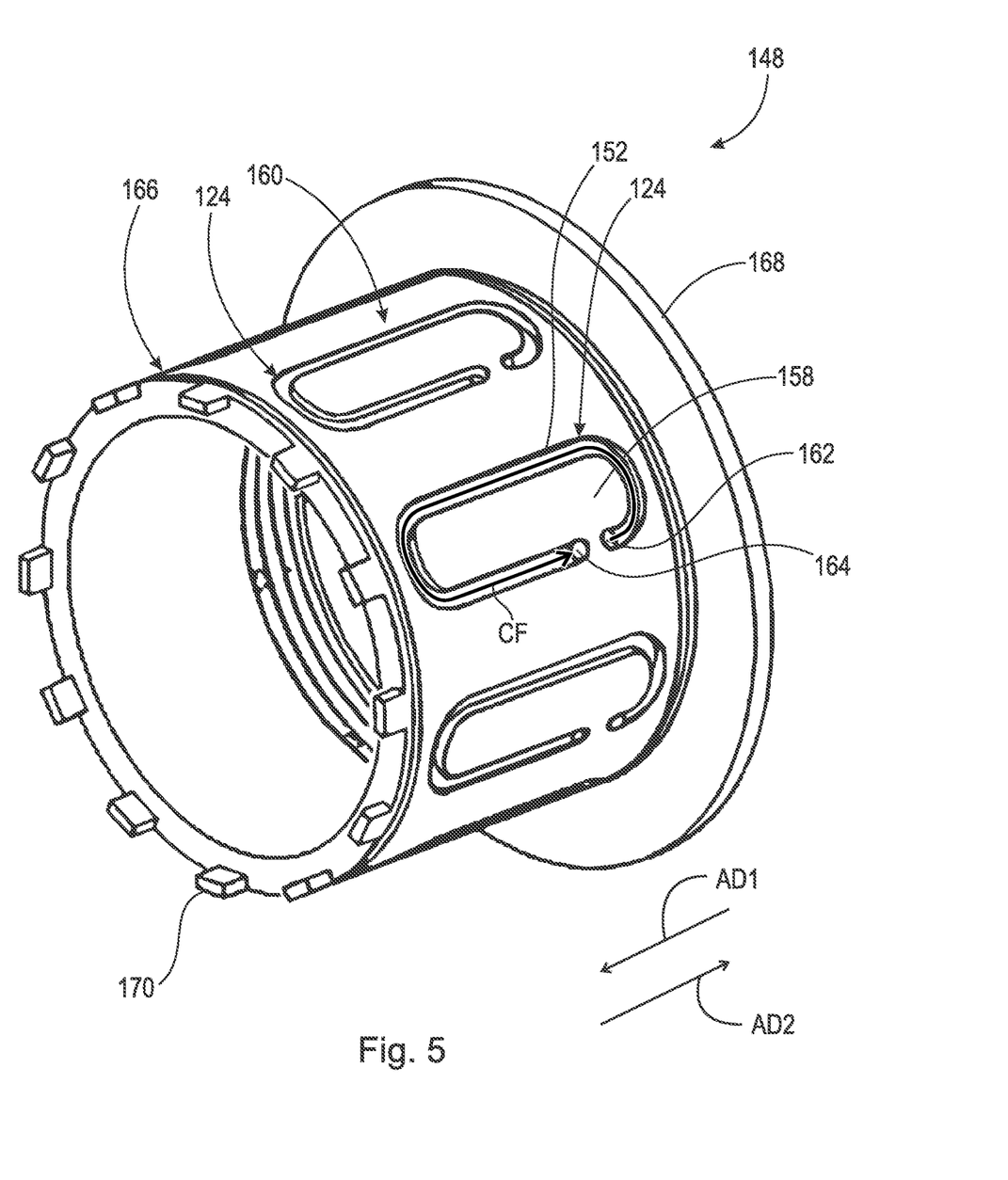
FIG. 5 is a perspective view of an inner carrier shown in FIG. 1.

FIG. 5 is a perspective view of inner carrier 148 shown in FIG. 1.

Figure 6:
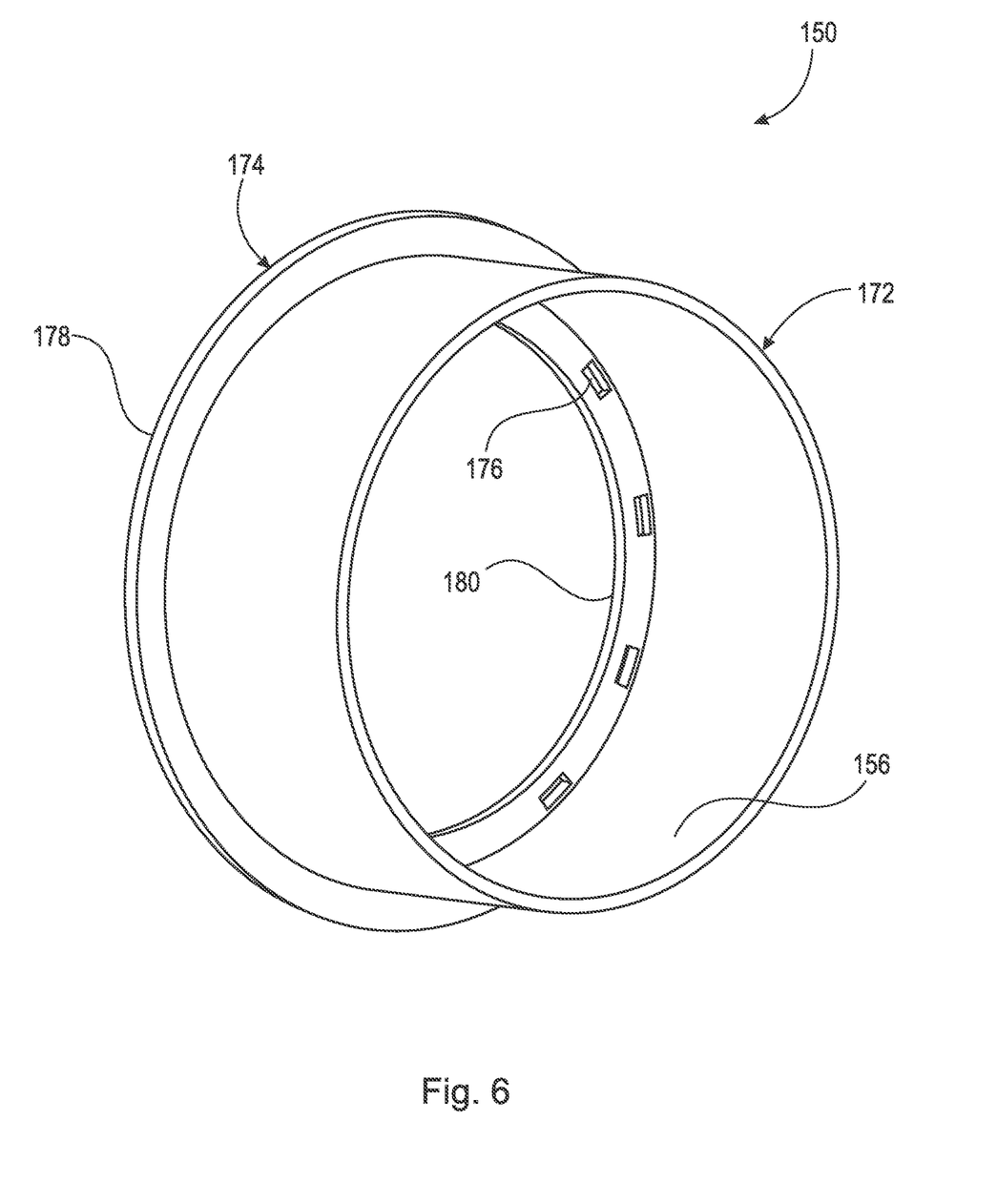
FIG. 6 is a perspective view of an outer carrier shown in FIG. 1.

FIG. 6 is a perspective view of outer carrier 150 shown in FIG. 1. The following should be viewed in light of FIGS. 1 through 6. In an example embodiment, rotor carrier 106 includes inner carrier 148 and outer carrier 150. In an example embodiment, assembly 100 includes multiple cooling chambers 124. The above discussion for chamber 124 is applicable to each of the multiple chambers 124. Each chamber 124 is formed by a respective channel 152 in carrier 148 and a respective portion 154 of radially inner surface 156 of carrier 150. For example, portions 158 of radially outer surface 160 of carrier 148 are partially surround by respective channels 152. Portions 154 and 158 can be in contact to prevent flow of fluid CF between portions 154 and 158, or portions 154 and 158 can be slightly separated to enable flow of fluid CF between portions 154 and 158. In an example embodiment, in both instances, fluid CF is sealed from stator 120 and motor gap 126.

In an example embodiment, flange 108 includes a single channel 128. Each chamber 124 includes an input port 162. Input ports 162 are in fluid communication with channel 128 via channel 163 radially between flange 108 and carrier 148. Thus, fluid CF flow through channel 128 to channel 163 and through channel 163 to input ports 162 and chambers 124. In an example embodiment, flange 108 includes a single channel 130. Output ports 164 for channels 124 are in fluid communication with channel 130 via channel 165 radially between flange 108 and carrier 148. Thus, cooling fluid CF flows from chambers 124 and ports 164 through channel 165 to channel 130.

In an example embodiment, carrier 148 includes body portion 166, flange 168, and tabs 170. Portion 166 includes surface 160 and grooves 152. Flange 168 extends radially outwardly from body portion 166. Tabs 170 extend from body portion 166 in axial direction AD1. In an example embodiment, carrier 150 includes body portion 172, flange 174, and openings 176. Portion 178 of flange 174 extends radially outwardly past body portion 172. Portion 180 of flange 174 extends radially inwardly past body portion 172 and includes openings 176. Tabs 170 are disposed in openings 176 to fixedly connect carrier 148 to carrier 150.

This paragraph is directed to the example configuration of torque converter 102 shown in FIGS. 1 and 2. Torque converter 102 includes stator 182, hub 184, channel 186 and channel 188. Channel 186 is: connected to chamber 136; arranged to connect to channel CH3, and bounded, at least in part, by hub 184. Channel 188 is: connected to chamber 138; arranged to connect to channel CH2, and formed between cover 110 and hub 184. Damper 140 includes: at least one resilient element 190 engaged with plate 144; plate 191 engaged with element 190; plate 192 non-rotatably connected to plate 191 and engaged with at least one resilient element 193; and output flange 194 engaged with element 193 and non-rotatably connected to output hub 145. Channel 196 is formed in hub 145 and connects channels 186 and CH3. Pendulum vibration absorber 197 is connected to damper 140 and turbine 116.

Assembly 100 can be used with any hydraulic system known in the art for supplying cooling fluid CF and fluid F1. For example: a transmission pump integrated in assembly 100, for example in housing 198; a separate transmission pump; or a transmission pump, engine driven off axis.

Figure 7:
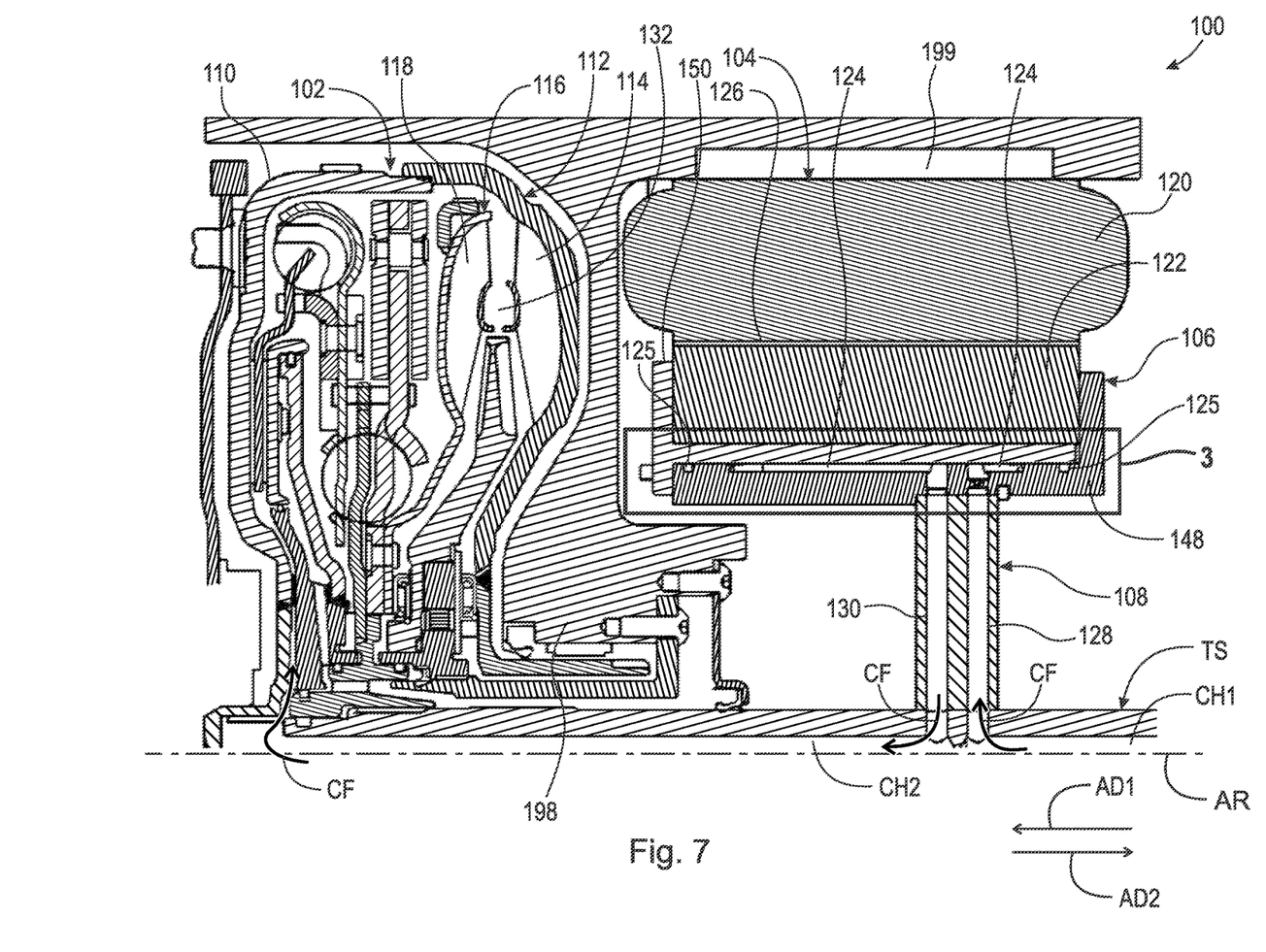
FIG. 7 is a partial cross-sectional view of a hybrid motor assembly with a stator cooling jacket.

FIG. 7 is a partial cross-sectional view of hybrid motor assembly 100 with a stator cooling jacket. In an example embodiment, assembly 100 includes cooling jacket 199 disposed radially about stator 120. Cooling jacket 199 is cooled by any means known in the art, including but not limited to water cooling or oil cooling. When stator 120 is isolated, or sealed from, cooling fluid CF, jacket 199 provides cooling of stator 120 while maintaining a dry environment for stator 120.

Figure 8:
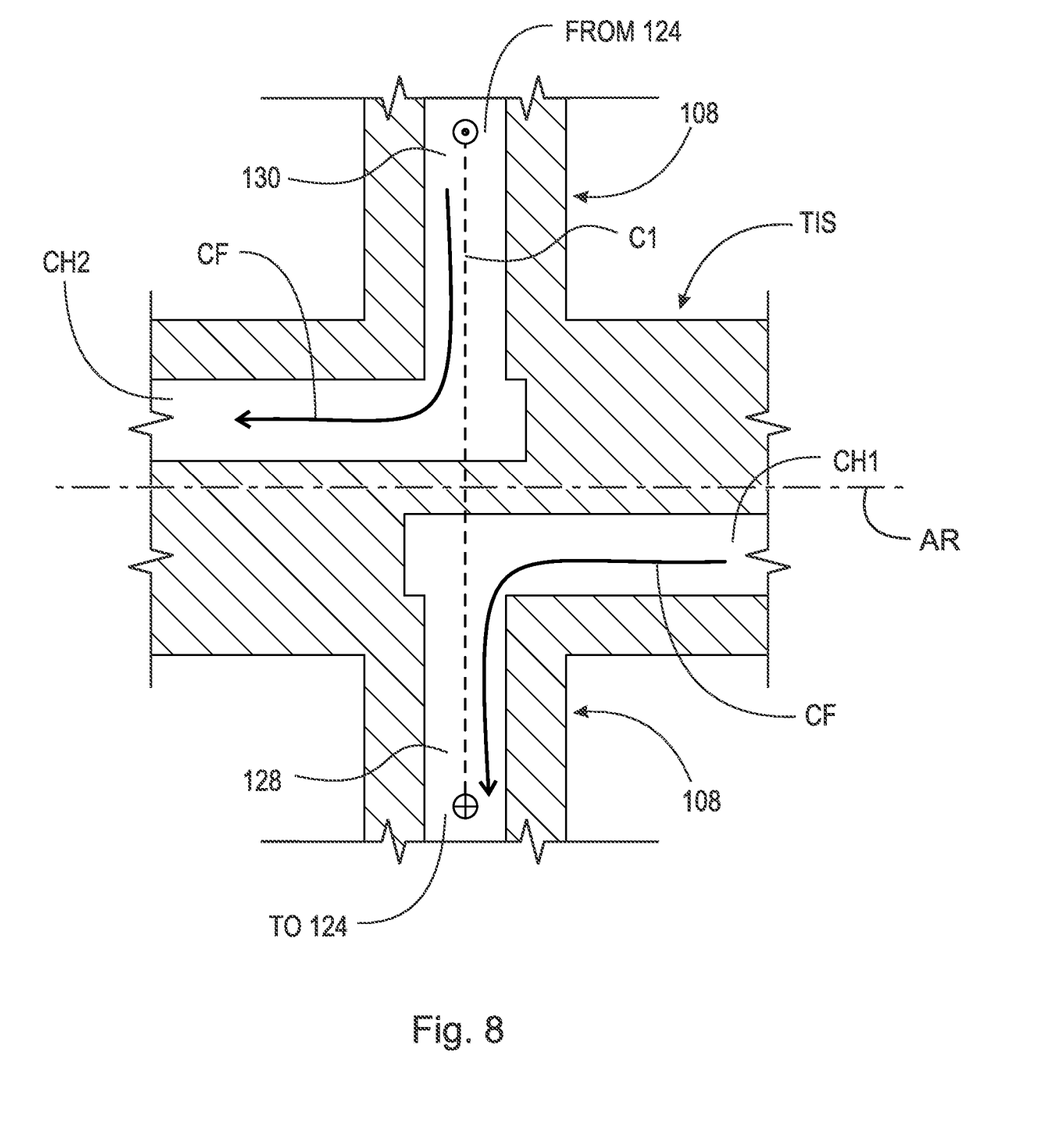
FIG. 8 is a detail of a flange for a hybrid motor assembly.

FIG. 8 is a detail of flange 108 for hybrid motor assembly 100. In an example embodiment, as shown in FIG. 8, to reduce the axial extent of flange 108, channel 130 is radially aligned with channel 128 and circumferentially off-set from channel 128. For example, circle C1, centered on and orthogonal to axis of rotation AR, passes through channels 128 and 130. In the example of FIG. 8, channels 128 and 130 are circumferentially off-set by 180 degrees. It should be understood that channels 128 and 130 can be circumferentially off-set by other degrees.

The following should be viewed in light of FIGS. 1 through 8. The following describes a method for operating a hybrid motor assembly, for example hybrid motor assembly 100. Although the method is presented as a sequence of steps for clarity, no order should be inferred from the sequence unless explicitly stated. A first step transmits a cooling fluid, for example fluid CF, from a first channel in a transmission input shaft, for example channel CH1 in shaft TIS, to an input channel in a flange non-rotatably connected to the transmission input shaft, for example channel 128 in flange 108. A second step flows the cooling fluid from the input channel through a cooling chamber, for example chamber 124, bounded, at least in part, by a rotor for an electric motor, for example rotor 122 for motor 104, and by a rotor carrier, for example carrier 106, non-rotatably connected to the rotor and the flange. A third step flows the cooling fluid from the cooling chamber through an output channel, for example channel 130, in the flange to a second channel, for example channel CH2, in the transmission input shaft. A fourth step flows the cooling fluid from the second channel into a torque converter, for example torque converter 102, the torque converter including a cover, for example cover 110, arranged to receive torque, an impeller, for example impeller 112, non-rotatably connected to the cover, and a turbine, for example turbine 116, in fluid communication with the impeller.

In an example embodiment, flowing the cooling fluid from the input channel through the cooling chamber includes: sealing the cooling fluid from a stator, for example stator 120, for the electric motor; or sealing the cooling fluid from a motor gap, for example motor gap 126, between the rotor and the stator.

In an example embodiment, flowing the cooling fluid from the second channel into the torque converter includes flowing the cooling fluid through a torus, for example torus 132, formed by the impeller and the turbine. In an example embodiment, flowing the cooling fluid from the second channel into the torque converter includes flowing the cooling fluid through a release chamber, for example chamber 138, for the torque converter, the release chamber bounded, at least in part, by the cover and a piston plate for a lock-up clutch for the torque converter, for example plate 142 for clutch 134.

In an example embodiment: a fifth step displaces, with a fluid in an apply chamber for the torque converter, for example fluid F1 in chamber 136, and with a first force, for example force FC1, the piston plate in a first axial direction, for example direction AD1, the apply chamber bounded, at least in part, by the piston plate; a sixth step non-rotatably connects the piston plate with the cover; a seventh step reduces the first force; an eighth step displaces, with the cooling fluid in the release chamber, the piston plate in a second axial direction, for example direction AD2, opposite the first axial direction; and a ninth step disengages the piston plate from the cover.

The following should be viewed in light of FIGS. 1 through 8. The following describes a method for operating hybrid motor assembly 100. A first step receives cooling fluid CF in cooling chamber 124. A second step seals stator 120 from cooling fluid CF.

The following should be viewed in light of FIGS. 1 through 8. The following describes a method for operating hybrid motor assembly 100. A first step receives cooling fluid CF with input channel 128. A second step discharges cooling fluid CF from cooling chamber 124 through output channel 130.

Assembly 100 and a method using assembly 100 address the problems noted above. For example, rather than pumping cooling fluid, such as automatic transmission fluid, through an input shaft for a transmission to flow out across a rotor in an electric motor and to spray stator end windings in the electric motor, fluid CF is directed through chambers 124 and then on to torque converter 102 as cooling and charge fluid for torque converter 102. Further, seals 125 seal stator 120 and gap 126 from fluid CF, enabling motor 104, for example with cooling jacket 199, to operate in a dry environment and to eliminate drag from fluid in gap 126. Further, torque converter 100 also operates in a dry environment, eliminating losses due to rotation of converter 100 though cooling fluid. As well, a larger pump is not needed to supply sufficient cooling oil to the rotor and transmission at low engine speeds. Thus, power losses associated with known methods of cooling a rotor are greatly reduced. Further, fluid CF is not drained back to the transmission sump after cooling rotor 122 (by-passing the transmission oil cooler). Instead, fluid CF is routed through the transmission cooler (for example via channel CH3) prior to returning to the transmission lubrication circuit and sump, reducing fluid temperature in the sump.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
C1 circle
CF cooling fluid
CH1 channel
CH2 channel
CH3 channel
CH4 channel
F1 fluid
FC1 force
FC2 force
FM friction material
SS stator shaft
TIS transmission input shaft
100 hybrid motor assembly
102 torque converter
104 electric motor
106 rotor carrier
108 flange
110 cover
112 impeller
114 impeller blade
116 turbine
118 turbine blade
120 stator
122 rotor
124 cooling chamber
125 seal
126 motor gap
128 input channel
130 output channel
132 torus
134 lock-up clutch
136 apply chamber
138 release chamber
140 torsional damper
142 piston plate
143 backing plate
144 input plate
145 output hub
146 hub
147 impeller shell
148 inner carrier
150 outer carrier
152 channel, carrier 148
154 portion, radially of inner surface 156
156 radially inner surface, carrier 150
158 portion of radially outer surface, carrier 148
160 radially outer surface, carrier 148
162 input port
163 channel
164 output port
165 channel
166 body portion, carrier 148
168 flange, carrier 148
170 tab for carrier 148
172 body portion, carrier 150
174 flange, carrier 150
176 opening, carrier 150
178 portion, flange 174
180 portion, flange 174
182 stator
184 hub
186 channel
188 channel
190 resilient element
191 plate
192 plate
193 resilient element
194 output flange
196 channel
197 pendulum vibration absorber
198 housing
199 cooling jacket

The invention claimed is:

1. A hybrid motor assembly, comprising:
an axis of rotation;
a torque converter including:
a cover arranged to receive torque;
an impeller non-rotatably connected to the cover; and,
a turbine in fluid communication with the impeller;
an electric motor including a stator and a rotor; and, a rotor carrier connected to the rotor and including a cooling chamber, the cooling chamber:
  bounded at least in part by the rotor carrier;
  sealed from the stator;
  arranged to receive a cooling fluid from a first channel in a transmission input shaft; and,
  arranged to discharge the cooling fluid to a second channel in the transmission input shaft, wherein:
the torque converter is arranged to receive the cooling fluid from the second channel in the transmission input shaft; and,
the torque converter is arranged to receive the cooling fluid from the cooling chamber without the stator receiving the cooling fluid.

2. The hybrid motor assembly of claim 1, further comprising:
  at least one seal in contact with the rotor carrier and sealing the cooling chamber from the stator.

3. The hybrid motor assembly of claim 1, further comprising:
  a flange non-rotatably connected to the rotor and including:
    an input channel in fluid communication with the cooling chamber and arranged to receive the cooling fluid; and,
    an output channel in fluid communication with the cooling chamber and arranged to discharge the cooling fluid.

4. The hybrid motor assembly of claim 3, wherein:
the input channel is arranged to receive the cooling fluid from the first channel in the transmission input shaft;
the output channel is arranged to discharge the cooling fluid to the second channel in the transmission input shaft; and,
the flange is arranged to non-rotatably connect to the transmission input shaft.

5. The hybrid motor assembly of claim 3, wherein:
the input channel is axially off-set from the output channel; or,
the input channel is circumferentially off-set from the output channel; or,
the input channel is aligned with the output channel so that a circle, centered on the axis of rotation, passes through the input channel and the output channel.

6. The hybrid motor assembly of claim 3, wherein the torque converter is arranged to receive the cooling fluid from the output channel.

7. The hybrid motor assembly of claim 3, wherein:
the torque converter includes a torus formed by the impeller and the turbine; and,
the torus is arranged to receive the cooling fluid from the output channel.

8. The hybrid motor assembly of claim 3, wherein:
the torque converter includes:
  a lock-up clutch including a piston plate; and,
  a release chamber bounded, at least in part, by the cover and the piston plate;
the release chamber is arranged to receive the cooling fluid from the output channel; and,
for a torque converter mode for the torque converter, the cooling fluid in the release chamber is arranged to axially displace the piston plate in a first axial direction to disengage the piston plate from the cover.

9. The hybrid motor assembly of claim 8, wherein:
the torque converter includes an apply chamber bounded, at least in part, by the piston plate; and,
for a lock-up mode for the torque converter, the apply chamber is arranged to receive a fluid to displace the piston plate in a second axial direction, opposite the first axial direction, to engage the piston plate with the cover.

10. The hybrid motor assembly of claim 9, wherein:
the torque converter includes a torus formed by the impeller and the turbine; and,
for the lock-up mode, the release chamber is in fluid communication with the torus.

11. The hybrid motor assembly of claim 1, wherein the rotor is arranged to non-rotatably connect to the transmission input shaft.

12. A hybrid motor assembly, comprising:
  an axis of rotation;
  a torque converter including:
    a cover arranged to receive torque;
    an impeller non-rotatably connected to the cover; and,
    a turbine in fluid communication with the impeller;
  an electric motor including a stator and a rotor;
  a rotor carrier connected to the rotor and including a cooling chamber bounded at least in part by the rotor; and,
  a flange non-rotatably connected to the rotor and including:
    an input channel in fluid communication with the cooling chamber and arranged to receive a cooling fluid from a first channel in a transmission input shaft; and,
    an output channel in fluid communication with the cooling chamber and arranged to discharge the cooling fluid to a second channel in the transmission input shaft, wherein:
the torque converter is arranged to receive the cooling fluid from the second channel in the transmission input shaft; and,
the torque converter is arranged to receive the cooling fluid from the cooling chamber without the cooling chamber discharging the cooling fluid to the stator and without the stator receiving the cooling fluid from the second channel in the transmission shaft.

13. The hybrid motor assembly of claim 12, wherein:
the input channel is axially off-set from the output channel; or,
the input channel is circumferentially off-set from the output channel; or,
the input channel is aligned with the output channel so that a circle, centered on the axis of rotation, passes through the input channel and the output channel.

14. The hybrid motor assembly of claim 12, wherein:
the torque converter includes a torus formed by the impeller and the turbine; and,
the torus is arranged to receive the cooling fluid from the output channel.

15. The hybrid motor assembly of claim 12, further comprising:
  at least one seal sealing the cooling chamber from the stator.

16. A method of operating a hybrid motor assembly, comprising:
  transmitting a cooling fluid from a first channel in a transmission input shaft to an input channel in a flange non-rotatably connected to the transmission input shaft;
  flowing the cooling fluid from the input channel through a cooling chamber bounded, at least in part, by a rotor for an electric motor and by a rotor carrier non-rotatably connected to the rotor and the flange;

flowing the cooling fluid from the cooling chamber through an output channel in the flange to a second channel in the transmission input shaft without flowing the cooling fluid to a stator; and, flowing the cooling fluid from the second channel into a torque converter without flowing the cooling fluid to the stator, the torque converter including a cover arranged to receive torque, an impeller non-rotatably connected to the cover, and a turbine in fluid communication with the impeller.

17. The method of claim 16, wherein flowing the cooling fluid from the input channel through the cooling chamber includes:

sealing the cooling fluid from a stator for the electric motor; or, sealing the cooling fluid from a motor gap, between the rotor and the stator, for the electric motor.

18. The method of claim 16, wherein flowing the cooling fluid from the second channel into the torque converter includes flowing the cooling fluid through a release chamber for the torque converter, the release chamber bounded, at least in part, by the cover and a piston plate for a lock-up clutch for the torque converter.

* * * * *